United States Patent

Bunting

[15] 3,689,008
[45] Sept. 5, 1972

[54] DEVICE FOR ADJUSTING A WEB-ADVANCING MECHANISM

[72] Inventor: Leslie J. Bunting, Rochester, N.Y. 14650

[73] Assignee: Eastman Kodak Company, Rochester, N.Y.

[22] Filed: May 3, 1971

[21] Appl. No.: 139,529

[52] U.S. Cl. .....................242/192, 226/91, 242/207
[51] Int. Cl. ...........................G03b 1/04, G11b 15/32
[58] Field of Search......................242/192, 197–200, 242/206–210; 226/49–52, 91

[56] References Cited

UNITED STATES PATENTS

| 3,463,372 | 8/1969 | Kirn | 226/49 |
| 3,468,498 | 9/1969 | Bunting | 242/207 |
| 3,601,334 | 8/1971 | Stark et al. | 242/192 |

Primary Examiner—Leonard D. Christian
Attorney—W. H. J. Kline and Milton S. Sales

[57] ABSTRACT

A self-threading motion picture projector including a film-feeding mechanism for feeding film from a supply roll supported on the projector to a film threading path through the projector mechanism. A film-advancing mechanism is adjustable to a forward projection mode for intermittently moving the film along the threading path away from the supply roll and to a still projection mode in which a single film frame may be projected as long as desired. When the film-feeding mechanism is adjusted to its active condition for feeding the leading end of the film from the supply roll, the film-advancing mechanism is automatically adjusted to its forward projection mode so that the film will be engaged by that mechanism and thereby moved away from rather than toward the supply roll.

4 Claims, 5 Drawing Figures

LESLIE J. BUNTING
INVENTOR.

LESLIE J. BUNTING
INVENTOR.

BY Milton S. Sales
W.W.J. Kline
ATTORNEYS

LESLIE J. BUNTING
INVENTOR.

DEVICE FOR ADJUSTING A WEB-ADVANCING MECHANISM

BACKGROUND OF THE INVENTION

1. Field of the Invention

The present invention relates to self-threading motion picture projectors of the type disclosed in my commonly assigned U.S. Pat. No. 3,468,498, which issued Sept. 23, 1969 and is entitled "Supply Roll Spindle Assembly for Cinematographic Projectors", the disclosure of such patent being hereby incorporated into this disclosure. More particularly, the present invention relates to the provision of such a projector with an improved mechanism which automatically adjusts the film-advancing mechanism to its forward projection mode when the film-feeding mechanism is adjusted to its active condition, thereby eliminating the need for an interlock device to prevent adjustment of the film-feeding mechanism to its active condition when the film-advancing mechanism is not in its forward projection mode.

2. Description of the Prior Art

The film-feeding mechanism for motion picture projectors as disclosed in my above-identified patent includes a drive member which is movable upon manual depression of an operating member to an active position at which a longitudinally movable endless belt is in peripheral engagement with a roll of film wound onto a supply reel, thereby imparting unwinding rotation to that roll. A stripper finger is also moved into peripheral engagement with the film roll to separate the leading end of the film from the roll and to guide it along a predetermined threading path partially defined between the stripper finger and the belt. By this means, the leading end of the film is caused to enter a film gate of the projector, where it is engaged by a pull-down claw or other equivalent film-advancing member which thereupon advances it intermittently through the film gate. By manual movement of a control lever, the film-advancing mechanism may be adjusted between "forward" and "reverse" projection modes. The patent refers to coassigned U.S. Pat. No. 3,463,372, entitled "Film Pull-Down and Control Mechanism for a Motion Picture Projector", issued in the name of Thomas G. Kirn which discloses means for enabling this type of film-advancing mechanism to be adjusted to a "still" projection condition in which a single film frame may be projected as long as desired.

It has been recognized that during the film-feeding operation, it is of course essential that the film-advancing mechanism be adjusted to its "forward" projection mode so that the film will be engaged by that mechanism and thereby moved away from rather than toward the supply roll. Therefore, in the mechanism disclosed in my U.S. Pat. No. 3,468,498, an interlock device is employed to prevent adjustment of the film-feeding mechanism to its active condition unless the control lever is at a position adjusting the film advancing mechanism to its "forward" projection mode.

While the interlock device is effective to prevent misuse of projectors equipped therewith, the resulting inability of the operator to adjust the film-feeding mechanism to its active condition if the film advancing mechanism is not in its "forward" projection mode may cause confusion in cases where the operator is unfamiliar with the projector and has not carefully read the instruction manual, since the operator may not immediately realize why the projector cannot be operated.

SUMMARY OF THE INVENTION

It is an object of the present invention to insure that the film-advancing mechanism in the above-described type of projector is adjusted to its "forward" projection mode whenever the film-feeding mechanism is adjusted to its active condition.

In accordance with the above object, I have provided a simple and reliable control lever shift mechanism adapted to be incorporated in the above-described type of projector wherein in response to adjustment of the film-feeding mechanism to its active condition, the film-advancing mechanism is automatically adjusted to its "forward" projection mode.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

The projector partially illustrated in the accompanying drawings is basically the same as the one described more specifically in my above-identified u.S. Pat. No. 3,468,498. However, the present description omits various components of the previously disclosed machine which did not relate directly to understanding the present invention. It will be understood, however, that such components are completely compatible with the subject device and have been deleted from the present disclosure only for purposes of clarity. Some of the elements shown in the accompanying drawings are identical to corresponding elements disclosed in the patent, while other elements shown in the accompanying drawings correspond only generally to the elements shown in the patent or do not have corresponding parts in the patent disclosure.

Figure 1:
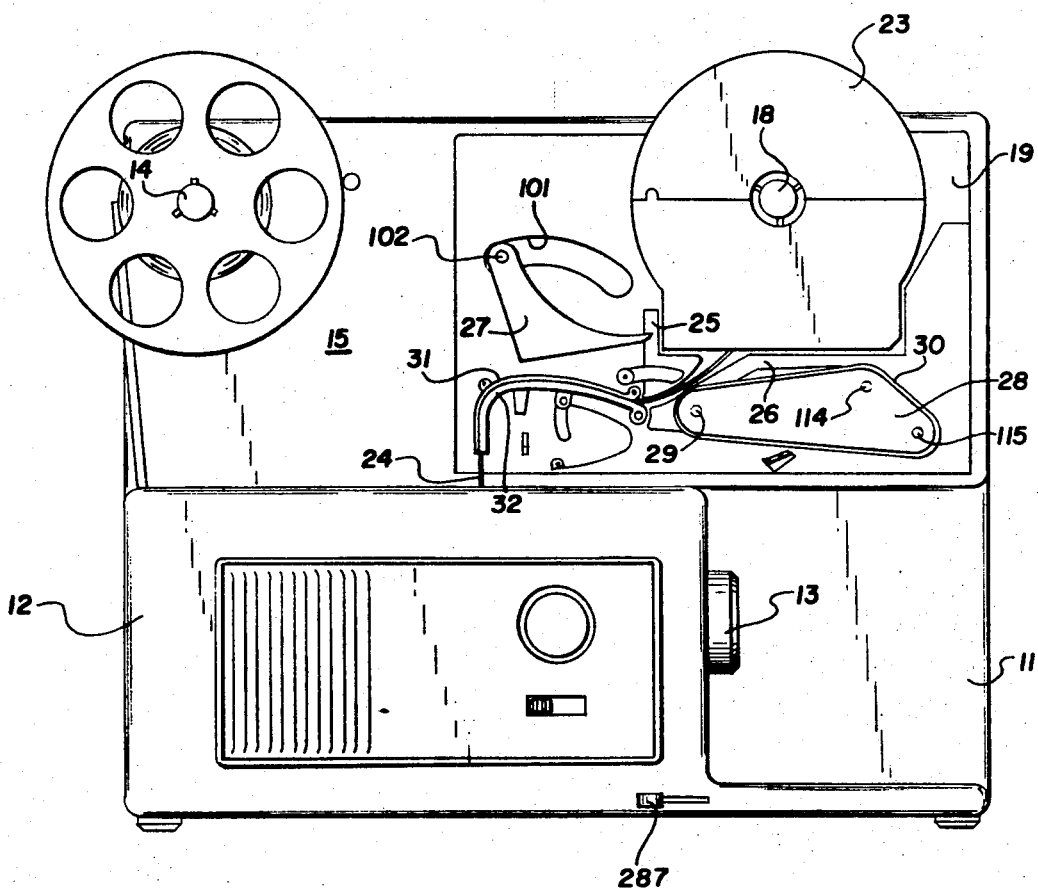
FIG. 1 is an elevational side view of a self-threading motion picture projector incorporating a preferred embodiment of the present invention.
Figure 2:
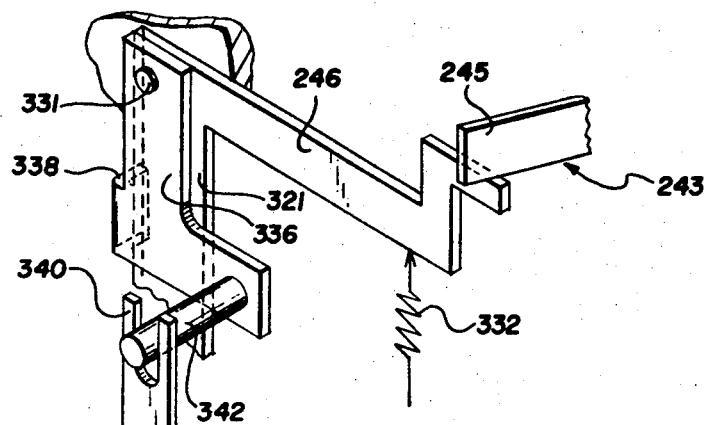
FIG. 2 is a perspective view of a portion of the self-threading motion picture projector shown in FIG. 1, taken from inside the projector to show the arrangement of internally located components.
Figure 2:
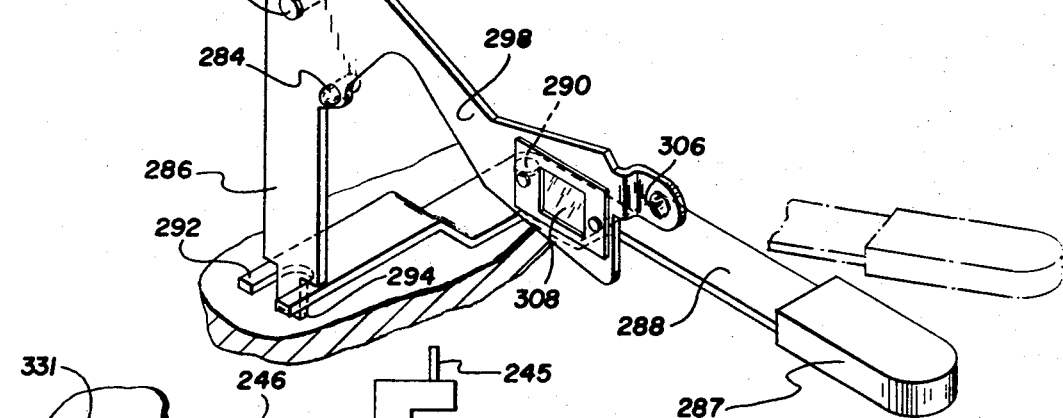

Referring to FIG. 1, the projector comprises a generally rectilinear casing member 11 including a housing 12 which extends laterally toward the side of the projector shown in that figure and supports a forwardly facing projection lens assembly 13. Above housing 12, a rotatable take-up reel spindle 14 extends beyond a vertical wall 15. A similar spindle 18 likewise extends beyond wall 15 through a mechanism plate 19 to receive a film reel housed within a cartridge 23 and containing a supply roll of film 24. Mechanism plate 19 includes a pair of film guide bosses 25 and 26 which define a film guide channel leading into a film passageway defined between a stationary guide shoe 31 and a pivotal guide shoe 32. The lower end of the film passageway defined between the two guide shoes is located directly above a generally conventional film gate, not shown, provided with a film-advancing mechanism such as a pull-down claw, not shown.

When the film cartridge initially is mounted on the projector, the leading end of the film must be separated from the film roll and fed along the path defined by the film guide bosses and the guide shoes in order that it will enter the film gate and will be engaged by the film pull-down claw, which thereafter propels it automatically into engagement with the hub of a film take-up reel mounted on spindle 14. As previously mentioned, this operation is performed by a film-feeding mechanism which comprises a drive member 28 and a stripper finger 27.

Drive member 28 comprises an endless elastic belt 30 of circular cross-section encircling three pulleys, not shown, supported in co-planar relation to one another between two parallel pulley support plates, one of which is shown in FIG. 1. Two of the pulleys are freely rotatable about their respective pivot studs shown at 114 and 115 extending between the two support plates. The other pulley, however, is supported by a drive shaft 29 which is constantly driven by appropriate drive means, not shown, thereby causing that pulley to rotate constantly in a counterclockwise direction as viewed in FIG. 1. The two pulley support plates are journaled to the drive shaft adjacent opposite faces of the pulley on shaft 29 and thereby allow the drive member to pivot between its inactive position as shown in FIG. 1 and an active position at which its moving belt 30 is in driving engagement with the roll of film in cartridge 23. Accordingly, when the drive member is moved to an active position, it imparts unwinding rotation to the film roll.

Stripper finger 27 is pivotally supported by a pin 102 for movement along a slot 101 into contact with the film roll to assume a position generally parallel to the adjacent position of the drive belt when both the finger and the belt are engaged with the film roll, thereby defining a film passageway leading into the channel between bosses 25 and 26. In operation, the film roll is rotated in an unwinding direction by the belt and the film roll is engaged by the stripper finger so that the leading end of the film engages the finger and is thereby separated from the roll and delivered along the threading path. The mechanism employed to move the drive member and the stripper member sequentially into engagement with the film roll is not shown but reference is made to U.S. Pat. No. 3,468,498 wherein such mechanism is fully disclosed.

As described in detail in U.S. Pat. No. 3,468,498, a reset lever 243 (shown also in FIGS. 2-5 of the accompanying drawings) cooperates with a cam member, not shown, to reset the projector mechanism from "rewind" operation during the subsequent film stripping operation. To perform this resetting operation, reset lever 243 has a rearwardly extending leg 245 which projects above the adjacent end of a cocking arm 246. Reference is made to the above-mentioned U.S. Pat. No. 3,468,498 for a detailed explanation of the operation of reset lever 243. Suffice it to say for the purposes of the present application that rearwardly extending leg 245 of the reset lever is caused to move downwardly with sufficient force to depress cocking arm 246 when the film-feeding mechanism is adjusted to its active condition for stripping the leading end of film from the supply roll, and when the film-feeding mechanism returns to its inactive condition, reset lever 243 is allowed to be restored to the position shown in FIG. 1.

The film-advancing mechanism of the projector is generally similar to the one described in my U.S. Pat. No. 3,468,398 in that a claw plate, not shown, is mounted to provide for vertically oriented up-and-down movement of the claw plate while also defining a vertical pivot axis about which a pull-down claw can move into or out of the perforations in the film in the projection gate, not shown. Behind the claw plate, a rotary shutter blade, not shown, and a cam member 275 are attached to a shaft 276 which constantly rotates in a clockwise direction as viewed in FIG. 3. A cam follower roller 278 projects rearwardly from the claw plate and is urged into contact with a peripheral cam surface 279 of the cam member by a spring 281, whereby the cam surface imparts predetermined vertical movement to the claw plate.

The front face of cam member 275 is provided with two concentric cam surfaces, not shown, of difference configurations. A cam follower pin 284, slidably supported in a control lever 286, is adapted to be aligned selectively with either of the two cam surfaces by moving the exteriorly accessible end 287 of an L-shaped lever 288 between its full line position and its phantom line position shown in FIG. 2. Lever 288 is pivotally mounted on the projector housing by a stud 290, and one end 292 of lever 288 is bifurcated to straddle the adjacent end 294 of control lever 286. As lever 288 is moved from its full line position to its phantom line position shown in FIG. 2, control lever 286 is pivoted about a stationary pivot stud 296 to the position shown in FIG. 4. When control lever 286 is in the position shown in FIGS. 2 and 3, cam follower pin 284 rides on the outer front cam surface of cam cam member 275, that cam surface being flat to provide no in-and-out movement to the pull-down claw. Thus, at such times, the film-advancing mechanism is adjusted to a "still" projection mode in which a single film frame may be projected for as long as desired. When lever 288 is moved to its position shown in phantom lines in FIG. 2, control lever 286 is moved to its FIG. 4 position to position cam follower pin on the inner front cam surface of cam member 275. Accordingly, the rotation of the cam member causes the pull-down claw to move both vertically and into and out of engagement with the perforations of the film within the projection gate. By virtue of the configurations and phase relationships of the inner front cam surface and peripheral cam surface 279, movement of the control lever to its phantom line position, FIG. 2, causes the film to be advanced downwardly through the projection gate for "forward" projection. While the film-advancing mechanism has only been partially shown and described, it will be recognized that mechanisms of this type are conventional and well within the scope of those skilled in the art. For further details, reference is made by my U.S. Pat. No. 3,468,498 and to U.S. Pat. No. 3,463,372 in the name of T. G. Kirn.

Control lever 286 has a detent arm 298 which cooperates with a plate 300 having a pair of recesses 302 and 304 which receive a cam 306 on the detent arm to releasably hold the control lever in the position set by L-shaped lever 288. When the film-advancing mechanism is adjusted to its "still" projection mode in which a single film frame is retained in the projection gate, it is possible that heat from the projection lamp will damage the film. Therefore, detent arm 298 carries a heat absorbing screen 308 which is moved between the projection lamp and the projection gate at such times to reduce the amount of heat reaching the film in the gate.

The previously mentioned cocking arm 246 is pivotally supported by a fixed stud 331 and is urged by a light spring 332 to a position in which it is engaged by the lower edge of reset lever 243. Except during operation of the film-feeding mechanism, the cocking arm is located with its depending leg 321 in a vertical position. A shifting lever 336 is also pivotally mounted on stud 331 and has a tab 338 aligned with the left edge of leg 321 as viewed in FIG. 3 so that clockwise movement of cocking arm 246 is effective to move the shifting lever therewith. The other end of control lever 286 is bifurcated as shown at 340 to straddle a stud 342 carried by shifting lever 336.

OPERATION

During normal operation of the projector, the film-advancing mechanism will be adjusted to its "forward" projection mode when the film-feeding mechanism is actuated to withdraw the leading end of film from the supply roll. When the projector is in the "forward" projection mode, L-shaped lever 288 will be in the position shown in phantom lines in FIG. 2 and control lever 286 will be rotated in a counterclockwise direction to the position shown in FIGS. 4 and 5. Rotation of the cocking lever to this position moves, by means of stud 342, shifting lever 336 to the position shown in FIG. 5 whereby tab 338 is removed from the path of depending leg 321 of cocking arm 246 when reset lever 243 is activated by the film-feeding mechanism to rotate cocking arm 246 in a clockwise direction.

Figure 3:
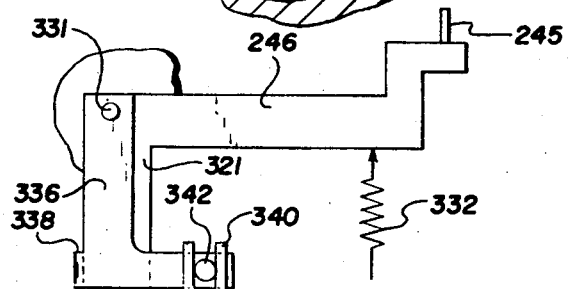
FIG. 3 is a rear elevational view of the portion of the self-threading motion picture projector shown in FIG. 2.
Figure 3:
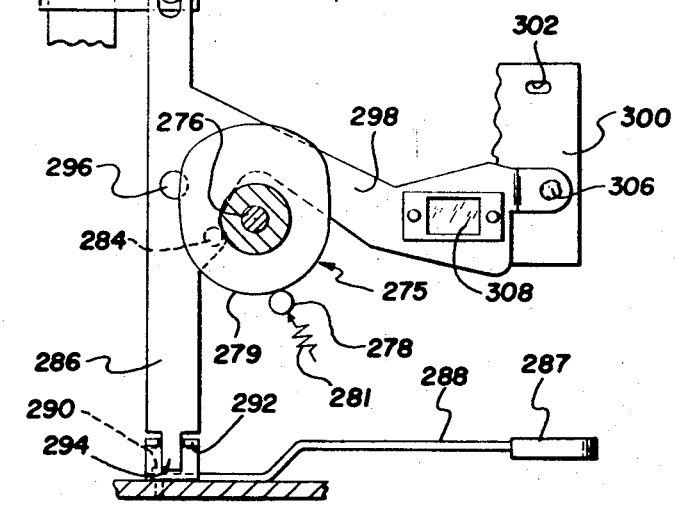
Figure 4:
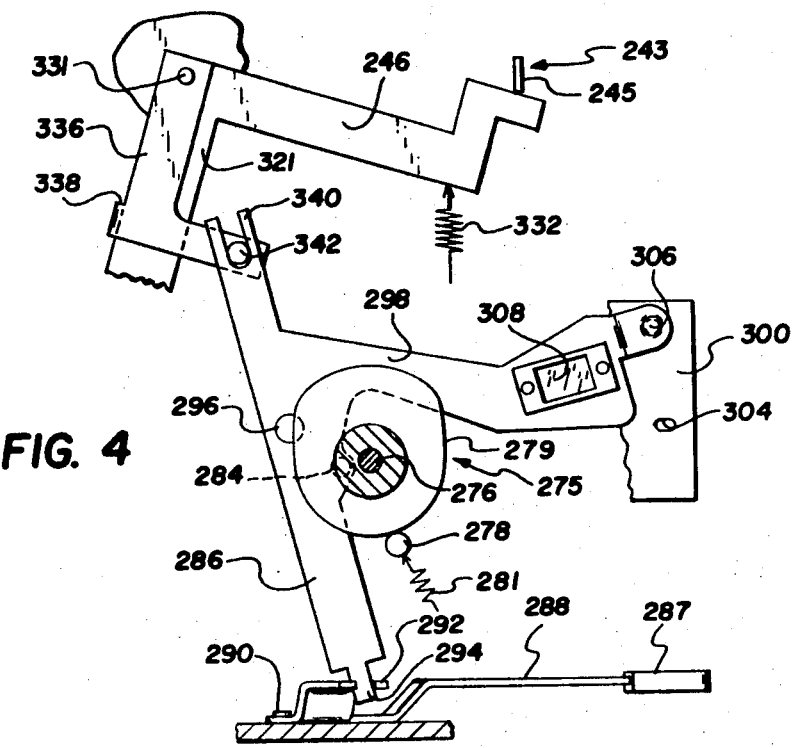
FIG. 4 is a view from the same viewpoint as FIG. 3, depicting the relative positions assumed by the various illustrated components of the portion of a motion picture projector adjusted to a "still" projection mode d uring operation of the film-feeding mechanism.
Figure 5:
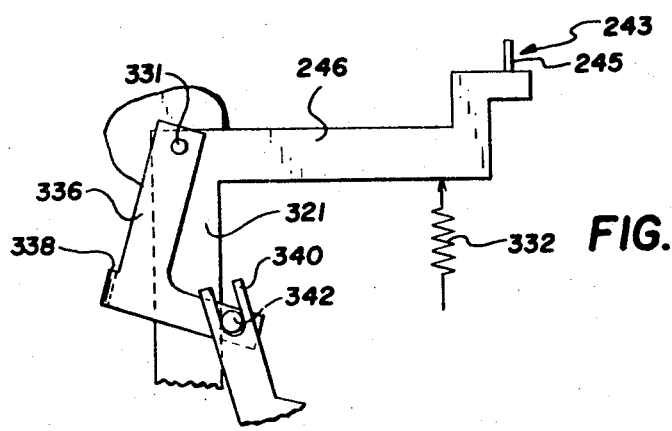
FIG. 5 is a view from the same viewpoint as FIG. 4, depicting the relative positions assumed by portions of the various illustrated components of the portion of a motion picture projector adjusted to a "still" projection mode when the film-feeding mechanism is adjusted to an inactive condition.

However, should the operator not place lever 288 in the forward position before activating the film-feeding mechanism, the disclosed apparatus will automatically adjust the film-feeding mechanism to its forward projection mode in accordance with the present invention. To further explain the operation of the apparatus, it will be assumed that the operator has left the projector apparatus in the "still" projection mode as shown in FIG. 3 when the film-feeding mechanism is adjusted to its active condition. At that time, rearwardly extending leg 245 of the reset lever is caused to move downwardly with sufficient force to rotate cocking arm 246 in a clockwise direction about stud 331 to the position shown in FIG. 3. Cooperation of the left edge of depending leg 321 of the cocking arm with tab 338 of shifting lever 336 moves the shifting lever along with leg 321. Stud 342 on the shifting lever causes control lever 286 to be rotated in a counterclockwise direction to the position shown in FIG. 4 to thereby move cam follower pin 284 to the inner front cam surface of cam member 275 to adjust the film-advancing mechanism to its "forward" projection mode.

It can be seen that by the present invention, I have provided means for automatically adjusting the film-advancing mechanism to its "forward" projection mode whenever the film-feeding mechanism is adjusted to its active condition. As such, I have eliminated the necessity of providing an interlock mechanism for preventing adjustment of the film-feeding mechanism to its active condition except when the film-advancing mechanism is in its forward projection mode.

The invention has been described in detail with particular reference to preferred embodiments thereof, but it will be understood that variations and modifications can be effected within the spirit and scope of the invention.

I Claim:

1. In an apparatus having (1) a housing, (2) means for supporting on said housing a supply roll of web material comprising an elongated strip of web material having a leading end, (3) means on said housing for defining a web threading path, (4) a web-feeding mechanism adjusted to an active condition for feeding the leading end of the web material from a supported supply roll to said threading path and to an inactive condition, and (5) a web-advancing mechanism adjustable to a first mode for advancing web material along said threading path from a supported supply roll and to a second mode wherein the web material is not advanced along said threading path from the supply roll; the improvement comprising means interconnecting said web-feeding mechanism and said web-advancing mechanism for automatically adjusting said web-advancing mechanism to its first mode whenever said web-feeding mechanism is adjusted to its active condition.

2. The improvement as defined in claim 1 wherein said adjusting means comprises:
   control means mounted on said housing for movement to a first position and to a second position for adjusting said web-advancing mechanism respectively to its first and second modes; and
   means interconnecting said control means and said web-feeding mechanism for moving said control means to its first position when said web-feeding mechanism is adjusted to its active condition.

3. The improvement as defined in claim 2 further comprising a stationary pivot stud on said housing and wherein:
   said control means comprises a lever rotatably mounted on said pivot stud; and
   said moving means comprises (1) an arm movable between a first position and a second position, (2) spring means for urging said cocking arm toward its first position, (3) means for moving said cocking arm to its second position when said web-feeding mechanism is adjusted to its active condition, and (4) means interconnecting said cocking arm and said control means for moving said control means to its first position when said cocking arm is moved to its second position.

4. The improvement as defined in claim 2 further comprising manually operable means for selectively moving said control means to its first position and its second position when said web-feeding mechanism is in its inactive condition.

* * * * *